E. H. SCHMIDT.
BRAKE HANDLE.
APPLICATION FILED AUG. 10, 1915.
1,304,606.
Patented May 27, 1919.
2 SHEETS—SHEET 1.
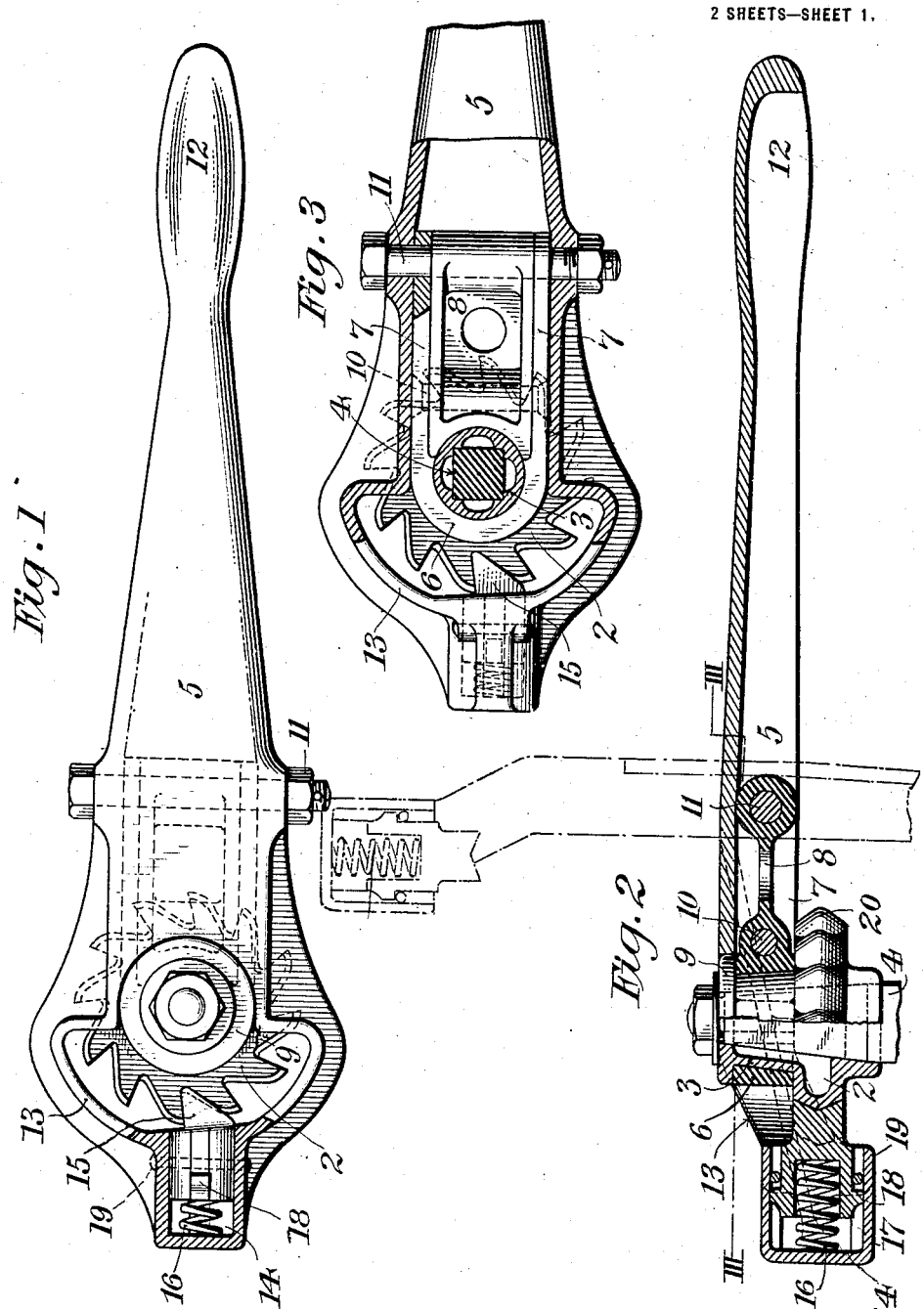
Inventor
Ernest H. Schmidt
By his Attorney

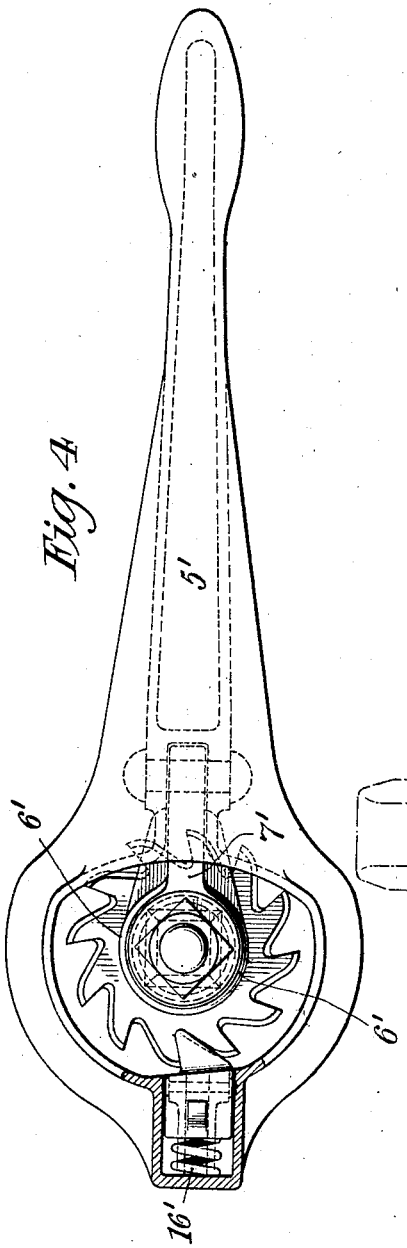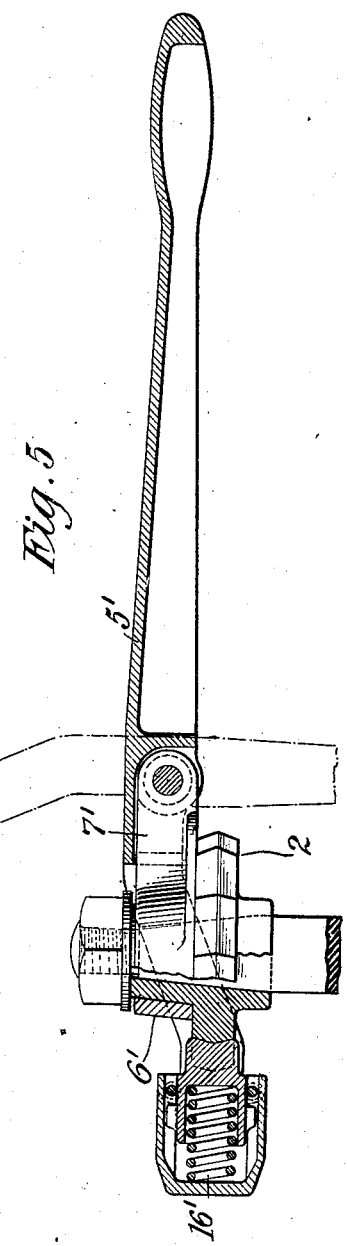

UNITED STATES PATENT OFFICE.

ERNEST H. SCHMIDT, OF CLEVELAND, OHIO, ASSIGNOR TO THE NATIONAL MALLEABLE CASTINGS COMPANY, OF CLEVELAND, OHIO, A CORPORATION OF OHIO.

BRAKE-HANDLE.

1,304,606.   Specification of Letters Patent.   Patented May 27, 1919.

Application filed August 10, 1915. Serial No. 44,764.

*To all whom it may concern:*

Be it known that I, ERNEST H. SCHMIDT, a citizen of the United States, residing at Cleveland, Cuyahoga county, Ohio, have invented new and useful Improvements in Brake-Handles, of which the following is a specification, reference being had to the accompanying drawings, in which:

Figure 1 is a plan, partly in section, showing my improved brake handle applied to a brake shaft; Fig. 2 is an elevation thereof, partly in section; Fig. 3 is a horizontal section on lines III—III of Fig. 2; Fig. 4 is a plan, partly in section, showing a modified form of my device, and Fig. 5 is an elevation thereof, partly in section.

My invention relates to brake handles, and consists particularly in providing a handle or lever for operating a hand brake shaft, so arranged that it may be dropped into a vertical non-operative position when not in use.

Referring to the drawings, 2 indicates a ratchet wheel having a collar or hub 3, rigidly mounted with respect to the brake shaft 4, and on the upper end of the shaft. The lever 5 is operatively connected with the ratchet wheel 2 by means of a bushing consisting of two parts, to wit, a strap 6, having laterally-extending legs 7, and a block 8, adapted to be inserted between the legs 7 and to bear against the collar 3. The strap 6 fits loosely about the collar 3 and beneath the outwardly-extending flange or shoulder 9, in which the collar 3 terminates at its upper end, and, with the block 8, is intended to be rotated thereabout. The block 8 is secured between the legs 7 by a rivet or pin 10 after the ratchet wheel has been put in position, and the lever 5 is secured to the device by a pin or bolt 11, which extends horizontally through the legs 7 and the block 8. At the end opposite its handle portion 12, the lever 5 is enlarged to form a loop-shaped portion 13, which, on the side opposite its connection to the strap 6, is downwardly offset and is provided with a socket 14, to receive the pawl 15 and the pawl-operating spring 16. Upon the upper and lower interior walls of the socket 14 are grooves 17, and upon the pawl are corresponding lugs 18 which fit in the grooves 17 and operate therein, and which serve to keep the pawl 15 from twisting.

After the spring 16 and pawl 15 have been inserted into the socket 14, the rivets or bolts 19 are applied and serve to close the open ends of the grooves 17, so that the spring 16 can only force the pawl 15 outwardly until the lugs 18 strike the rivets 19. The lever 5 and with it the pawl 15 and the strap 6 are free to rotate or oscillate in a horizontal plane about the collar 3 of the ratchet wheel 2. The lever and pawl may also rotate in a vertical plane about the pin or pivot 11 of the legs 7 of the strap 6. When the handle-end 12 of the lever 5 moves down to non-operating position, as is shown in dotted lines in Fig. 2, the pawl 15 is thereby raised vertically out of engagement with the ratchet wheel 2. The ratchet teeth have their outer edges beveled, as is shown in Fig. 2, and the forward end of the pawl 15 is correspondingly shaped, or recessed.

To operate the brake the brakeman raises the lever to the horizontal operating position shown in full lines in Fig. 2, in which the beveled teeth 20 of the ratchet wheel coöperate with the recessed face of the pawl 15. The spring 16 is preferably of a strength sufficient only to maintain the pawl 15 in contact with the ratchet teeth 20, so that when the handle 12 is released the lever will drop down to non-operative position. When the lever 5 is raised into operating position, the pawl 15 comes into contact with the ratchet teeth and is pushed rearwardly by the teeth until the lower edge of the pawl has passed the middle point of the ratchet teeth, when the pawl will be allowed to move forwardly again, with its recessed face fitting closely against the beveled faces of the ratchet teeth.

The handle-end 12 of the lever 5 is held from movement above a horizontal plane by the legs 7 of the strap 6, against which the under surface of the lever will bear and will thus prevent further upward movement. The pivotal point 11 between the lever 5 and the strap 6 is somewhat above the level of the pawl and ratchet, which permits the pawl 15 to move upwardly out of engagement with the ratchet very readily, because the arc of its motion is slightly away from the ratchet wheel, and hence does not necessitate driving the pawl 15 inwardly against the spring 16 to as great an extent as would be necessary if the lever 5 were pivoted at a lower point.

In Figs. 4 and 5 I have shown a modified form of my device, in which the lever 5' is secured to a bushing 6', which has a lateral extension 7' and to which the lever is pivoted. As in the form shown in Figs. 1, 2 and 3, the spring 16' may be arranged to have only sufficient strength to keep the pawl pressed against the ratchet, but not sufficient to maintain the lever in horizontal position when not in use.

The terms and expressions which I have employed are used as terms of description and not of limitation, and I have no intention, in the use of such terms and expressions, of excluding any mechanical equivalents for the features shown and described, but recognize that various modifications may be made within the scope of the invention claimed.

What I claim is:

1. In brake mechanism, a brake shaft, a ratchet wheel positioned thereon, a bushing movable relatively to the ratchet wheel and the brake shaft, and a lever pivoted to said bushing and carrying a pawl, the pawl and the pivot to the lever being on opposite sides of the ratchet wheel, said pawl being adapted to be brought into engagement with the ratchet to actuate the brake shaft and being normally maintained in a vertical position out of engagement with the ratchet, and being bodily movable vertically away from the ratchet by the handle when the handle is moved to non-operative position, said pawl when in engagement with the ratchet wheel being reciprocated in a horizontal plane upon the backward movement of the handle.

2. In brake mechanism, a brake shaft, a ratchet wheel positioned thereon, a collar on the ratchet wheel, a bushing mounted on the collar movable relatively thereto, a lever pivoted to said bushing and carrying a pawl, the pawl and the pivot to the lever being on opposite sides of the ratchet wheel, a flange on the collar adapted to hold the bushing in position therein, the pawl mounted in the handle capable of movement in a horizontal plane when the handle is in operative position and being movable with the handle to non-operative position vertically to a position out of engagement with said ratchet, said pawl when in engagement with the ratchet wheel being reciprocated in a horizontal plane upon the backward movement of the handle.

3. In brake mechanism, a brake shaft and ratchet wheel positioned thereon, a bushing movable relatively to the ratchet wheel and the brake shaft and a lever pivoted to said bushing capable of movement in a vertical plane into and out of operative position, said lever containing a pawl chamber, a pawl mounted therein adapted to be moved into and out of operative engagement with the ratchet on the rotary movement of the lever about its pivot and a spring by which relative horizontal movement between the pawl and ratchet is permitted, the pawl and the pivot to the lever being on opposite sides of the ratchet wheel, said pawl when in engagement with the ratchet wheel being reciprocated in a horizontal plane upon the backward movement of the handle.

4. In brake mechanism, a brake shaft, a ratchet wheel positioned thereon, a bushing movable relatively to the ratchet wheel and the brake shaft and a lever pivoted to said bushing capable of movement in a vertical plane into and out of operative position, said lever having a loop shaped opening taking about said ratchet and bushing, a pawl on said lever adapted to be moved into and out of operative engagement with the ratchet on the rotary movement of the lever about its pivot and a spring by which a reciprocating movement between pawl and ratchet in a horizontal plane is permitted.

5. In brake mechanism, a brake shaft, a ratchet positioned thereon, a bushing, movable relatively to said ratchet wheel and the brake shaft and a lever pivoted to said bushing and carrying a pawl, the pawl and the pivot to the lever being on opposite sides of the ratchet wheel, said pawl being movable in one plane while in operative engagement with said ratchet and movable bodily in a plane at substantially right angles to said first named plane to disengage said handle from said ratchet, said pawl when in engagement with the ratchet wheel being reciprocated in a horizontal plane upon the backward movement of the handle.

6. In brake mechanism, a brake shaft, a ratchet wheel positioned thereon, a hub on the ratchet wheel, a bushing mounted on said hub and movable relatively to the ratchet wheel and the brake shaft, said bushing consisting of a strap having laterally extending legs and a block positioned between said legs, a lever secured by a pivot pin to the laterally extending legs of the bushing and carrying a pawl, the pawl and pivot to the lever being on opposite sides of the ratchet wheel, said pawl being adapted to be brought into engagement with the ratchet to actuate the brake shaft and being normally maintained in a vertical position out of engagement with the ratchet and being bodily movable vertically away from the ratchet by the lever when the lever is moved to non-operative position, said pawl when in engagement with the ratchet wheel being reciprocated in a horizontal plane upon the reverse movement of the lever.

ERNEST H. SCHMIDT.